Dec. 22, 1959   S. P. KINNEY   2,918,172
AUTOMATIC SELF-CLEANING STRAINER
Filed Nov. 23, 1956   3 Sheets-Sheet 1

INVENTOR.
SELWYNE P. KINNEY.
BY
Christy, *Parmelee*
*Strickland*
ATTORNEYS.

Dec. 22, 1959     S. P. KINNEY     2,918,172
AUTOMATIC SELF-CLEANING STRAINER
Filed Nov. 23, 1956     3 Sheets-Sheet 2
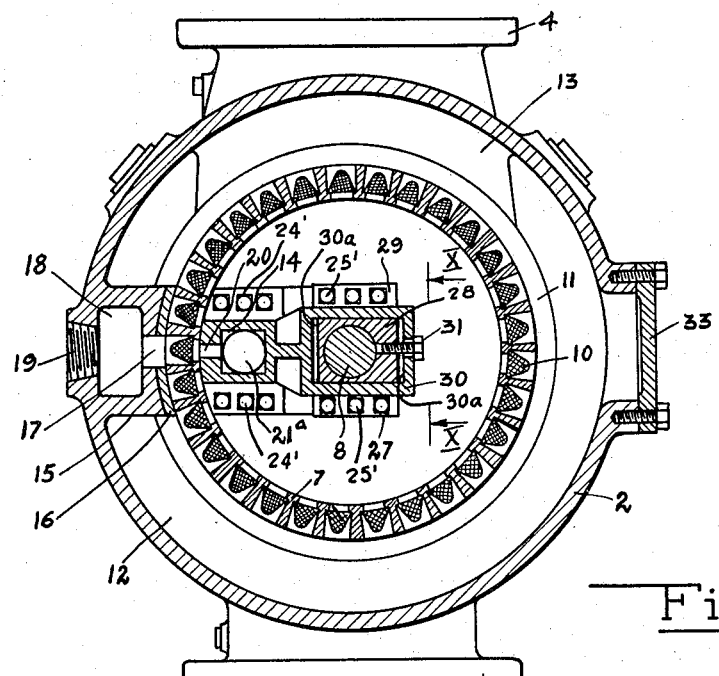
Fig. 2.
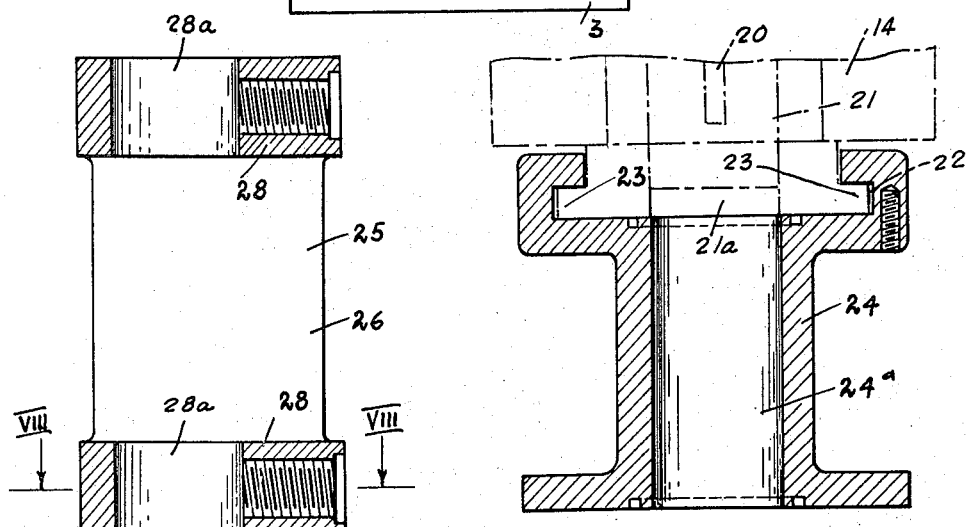
Fig. 6.
Fig. 7.
INVENTOR.
SELWYNE P. KINNEY.
BY
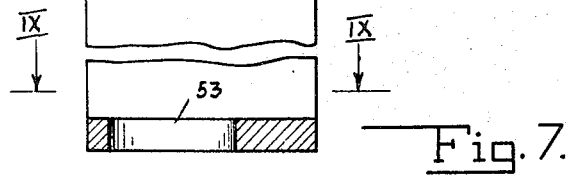
ATTORNEYS.

INVENTOR.
SELWYNE P. KINNEY.
BY
ATTORNEYS.

United States Patent Office 2,918,172
Patented Dec. 22, 1959

2,918,172
AUTOMATIC SELF-CLEANING STRAINER

Selwyne P. Kinney, Pittsburgh, Pa., assignor to S. P. Kinney Engineers, Inc., Carnegie, Pa., a corporation of Pennsylvania Application November 23, 1956, Serial No. 624,056

1 Claim. (Cl. 210—392)

This invention relates to industrial strainers for maintaining a pumping system free of solids, while at the same time automatically keeping itself flushed of such material strained from the water.

Many industries utilize water drawn directly from local streams or sumps to provide the water needed in manufacturing processes. In so doing, foreign matter such as pebbles, sand and vegetation may be drawn into the water system which should be removed before the water is used for its intended purpose. Also, water used industrially often is contaminated by solids which must be removed before the water is recirculated or discharged into streams. These solids or foreign material become lodged in the straining media, clogging the flow of water or other liquid therethrough, so that this material must be periodically removed.

Rotary drum strainers are extensively used for this purpose, the dirty water surrounding the exterior of the drum and passing through cup-like strainer elements in the wall of the drum which provide the straining media. The strained water is discharged axially from the exterior of the drum at one end. It is customary, moreover, at one point in the rotation of the drum, to provide a reverse flush channel where water on the interior of the drum may flow in the reverse direction through the media to flush away the debris that has lodged therein. This requires that the pressure in the interior of the drum be greater than atmospheric pressure, as a result of which the pump for forcing water through the strainer must be on the intake side of the strainer and the unstrained water must therefore flow through the pump.

The present invention has for its principal object to provide a rotary drum strainer with reverse flushing so constructed as to be independent of the water pressure inside the drum and thereby enable the pump to be located on the delivery side of the strainer, so that only water which has been first strained passes into the pump.

Still another object is to provide in a liquid pumping system a strainer device of the above type which connects liquid under pressure from the outlet side of the pump to the normal outlet sides of the strainer elements and thereby positively insure reverse flow flushing of the strainer elements therein.

Another object is to provide a strainer in which provision is made for adjustment of such wear as may occur on the face of the shoe through which the flushing water is provided, and thereby avoid the need for an excessive volume of water.

Other objects and advantages will appear in the following more detailed description of the invention when taken in connection with the accompanying drawings, wherein:

Fig. 2 is a sectional view taken in a plane on the line II—II of Fig. 1;

Fig. 6 is an enlarged elevational section of a separate stationary element of the strainer device shown in Fig. 1;

Fig. 7 is an enlarged elevational section of another separate stationary part of the strainer device shown in Fig. 1;

Figure 1:
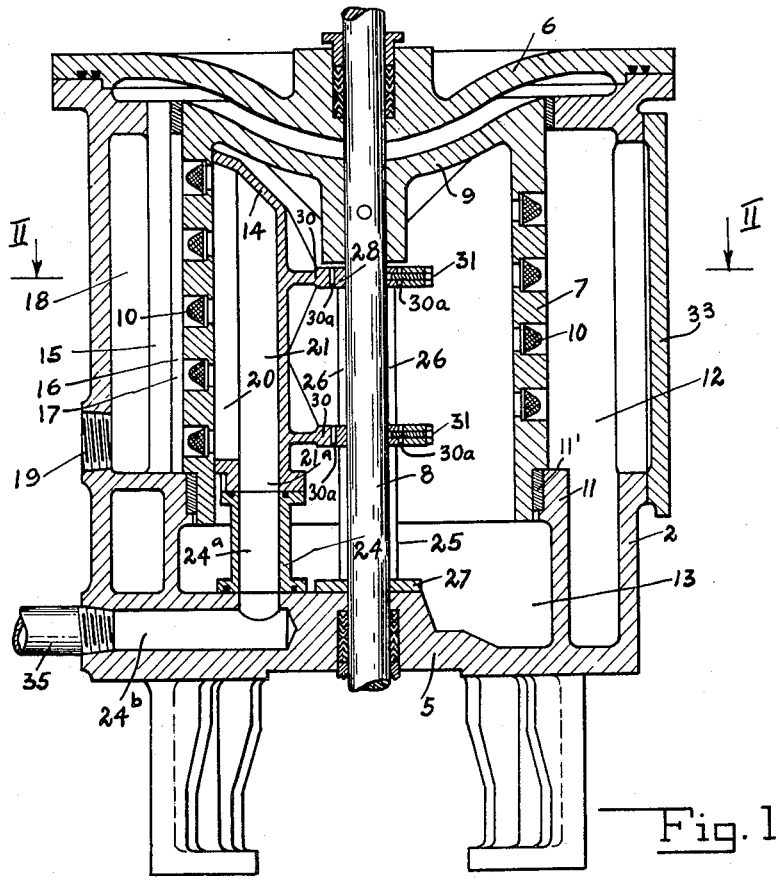
Fig. 1 is a sectional elevation of a self-cleaning strainer device embodying this invention.

Referring to the drawings, the strainer comprises a generally cylindrical casing 2 having a water inlet connection 3 at the bottom, and opposed to this is a water outlet 4. The casing has a bottom 5 and a removable head or cover 6. Within the casing is a rotary drum 7 carried on a vertical drive shaft 8 that projects through the top of the casing and is driven by a motor (not shown) in the usual manner. There is also a thrust bearing (not shown) on the bottom of the casing for the lower end of this shaft. The drum is closed at the top by an end wall 9 and it has holes through the side walls in which are secured cup-like strainer elements 10. The lower end of the drum is rotatably sealed as at 11', into a fixed annular partition 11 on the bottom of the casing which separates the incoming water from the outflowing water, the drum being open at its bottom, the seal including a wear ring 11', this seal being of a type common to rotary drum strainers and forming no part per se of the present invention.

There is a chamber 12 surrounding the drum into which the incoming dirty water rises to surround the drum. It flows through the straining media 10 into the interior of the drum, out the bottom of the drum into an outlet channel or chamber 13 leading to the outlet connection 4. So much of the strainer is generally known to the art.

According to the present invention there is provided a back-wash water supply shoe 14 on the inner face of the drum and a confronting back-wash discharge shoe 15 on the exterior of the drum, these shoes being substantially coextensive in length or height with the interior surface of the drum and of a width such as to engage an arc of only a few degrees of the wall of the cylindrical drum, the periphery of which rotates between the shoes. The inner shoe 14 for example (see Fig. 2) has a face which engages the wall of the drum of a width slightly greater than the diameter of one of the media-receiving holes, and the outer shoe 15 is preferably somewhat wider.

The outer shoe 15 is rigidly formed on the interior of the casing 2 and has a face plate 16 thereon that contacts the face of the drum. It has a vertical slot 17 in its face 16 that opens into a duct or chamber 18, and the casing has an opening 19 therein into which a discharge pipe is connected for carrying liquid from the interior of the shoe 15.

The face of the inner shoe 14 has a narrower slot 20 in its face behind which is a water supply chamber 21. The inner shoe is adjustably radially against the inner face of the drum, and for this purpose it is provided with flanges 22 slidably retained in guideways 23 on the top of a fixed supporting base member or block 24 inside the casing (see Fig. 6), the support being bolted to the bottom 5 of the casing as indicated by the bolts 24' in Fig. 2. The chamber 21 in this shoe has an opening 21a through its bottom that registers with a vertical passage 24a in the base block 24. Water under pressure may flow through passage 24b in the bottom of the casing, upwardly into the passage 24a in the supporting member, and through opening 21a into the chamber 21 of the shoe.

Figures 3, 4, 5:
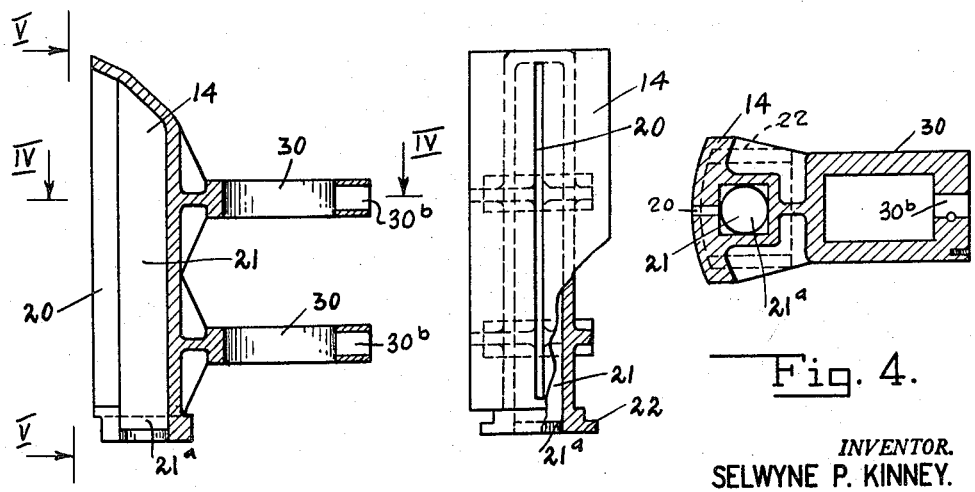
Fig. 3 is an enlarged sectional view of a portion of Fig. 1 shown as a separate part.
Fig. 4 is a sectional view taken in a plane on the line IV—IV of Fig. 3.
Fig. 5 is an elevational view, partly in section, taken in a plane on the line V—V of Fig. 3.
Figure 8:
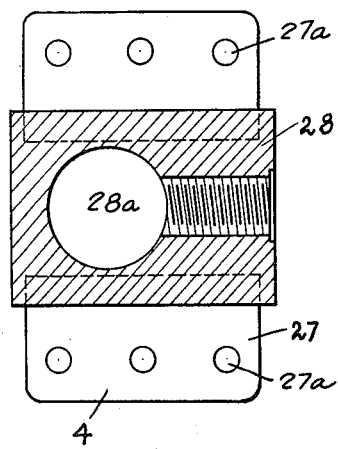
Fig. 8 is a sectional view taken in a plane on the line VIII—VIII of Fig. 7.
Figure 9:
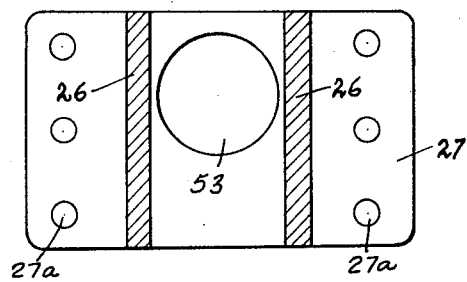
Fig. 9 is a sectional view taken in a plane on the line IX—IX of Fig. 7.

For adjustably holding the shoe 14 in position a stand 25 is placed around the drive shaft 8. The stand has two upright webs 26, a base 27 through which the shaft passes, and two vertically spaced rectangular bearing blocks 28, the stand being an integral casting as shown in Fig. 7 and the blocks 28 having aligned openings 28a through which the shaft 8 passes. The base of the stand 25 has laterally-extending feet or flanges 27 by means of which it is bolted to the inside of the bottom of the casing, as indicated by the bolts 25' in Fig. 2. The back-wash water supply shoe 14 is provided with at least two rectangular slotted yokes or frames 30 (see Figs. 2, 3 and 4) at the rear face thereof. The stand 25 extends through these yoke slots, the yokes embracing two opposite faces of the bearing block portions 28 of the stand. The remaining opposite faces of block portion 28 are spaced from the yoke slot as indicated at 30a (Fig. 1). Set screws 31 pass through openings 30b in the rear of these frames and are threaded into the bearing block portions 28 of the stand.

The stand of course is held from rotation with the shaft 8 by reason of the fact that the stand flange 27 is bolted to the casing, said bolts passing through the openings 27a of said flange. The yokes 30 fitted about the stand thereby restrain the shoe 14 from rotation while the set screws 31 can be adjusted to bear against the back surfaces of the yoke frames and urge the face of the shoe 14 against the inner face of the drum. This adjustment is made possible by reason of the fact that the bottom of the shoe 14 is slidably mounted in the guideway 23 on the top of the fixed supporting base member 24.

Figure 10:
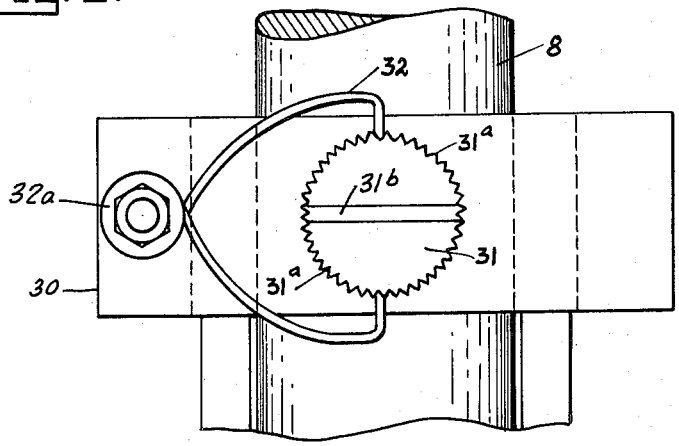
Fig. 10 is an elevation taken of a portion of the strainer device on the lines X—X of Fig. 2.

As shown in Fig. 10 the set screw 31 may be provided with a knurled periphery 31a. A spring retainer of non-rusting metal 32 mounted by screw 32a on the back of the frame 30 engages in the serrations in the head of the bolt or screw 31 and restrains it from loosening under vibration. The head of the screw or bolt is provided with a kerf 31b as shown in Fig. 10 so that it can be turned with a screw driver. For this purpose the casing is provided with a cover 33 opposite each of these screws 31. To gain access to the screw the cover 33 is removed, the strainer 10 in the hole which is aligned with the screw 31 is taken out, and the screw then turned by using a long screw driver, and then the parts so removed are replaced. This adjustment is one which needs to be made quite infrequently as the normal wear of the shoe against the surface of the drum is very small. Moreover the range of adjustment is of very small magnitude, so that the opening 21a in the bottom of the inner shoe will always be in register with the vertical passage 24a in the supporting base 24.

In operation a water supply line 35 is connected to the passage 24b in the bottom of the casing, and this water supply line is connected to a source of clean water. Water flowing into the strainer through this line enters the chamber 21 in the back-wash shoe 14, flows through the strainer media into the confronting shoe 15, and out this shoe to a drain.

Figure 11:
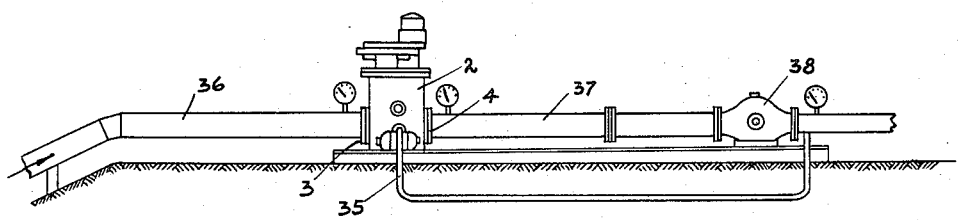
Fig. 11 is an elevation of a liquid pumping system incorporating the strainer device shown in Figs. 1 and 2.

In Fig. 11 there is a typical system showing the manner of using the strainer. In this figure 36 is an intake pipe which may lead from a stream or sump from which the water is supplied to the system. It connects to the intake 3 of the strainer. The strained water flows through discharge pipe 37 to the pump 38. Pipe 35 for the flushing water leads from the discharge pipe of the pump 38 back to the strainer. Since the reverse flushing of the strainer media is not dependent upon having a pressure on the inside of the rotary drum greater than atmospheric pressure, it is possible for the pump to be thus located on the discharge side of the strainer instead of having to be placed on the intake side of the strainer as with previous strainers of this type. Formerly it had to be on the intake side of the strainer in order that the pressure of the strained water would be sufficiently higher than atmospheric pressure to effect the reverse flow of water from the interior of the drum through the clogged strainer media into the reverse flushing shoe. With the provision of opposed flushing shoes of the present invention, the water used for flushing can be supplied from any source which is at a pressure higher than atmospheric pressure, and the most convenient source of course is the discharge side of the pump now located so that only the strained water flows through the pump. This affords substantial protection to the pump and decreases wear in the pump. At the same time the capacity of the strainer is not diminished; the cost of installation is very little more, and the amount of water required for reverse flushing is no greater than with the previous systems, and if desired, greater pressures of the back flushing stream can be obtained.

While I have shown and described one particular embodiment of my invention it will be understood that the invention is not restricted to the exact construction and arrangement of parts herein disclosed, and that various changes and modifications may be made within the contemplation of my invention and under the scope of the following claim.

I claim:

A strainer comprising a rotary drum having straining media in its periphery, a casing surrounding the drum and providing between the drum and casing a water inlet chamber, an outlet in the casing at one end of the drum through which liquid from the interior of the drum may flow, the casing having a rigid bottom and a cover, a shaft on which the drum is carried, said shaft being journaled in said cover and bottom, a support secured to the inside of the bottom of the casing having a vertical passage therethrough, a straining media-flushing shoe on said support inside the drum supported by and slidably sealed against the top of the hollow fixed support, the flushing shoe having a hollow interior with a port registering with the vertical passage in the support, the shoe having a transversely curved front face bearing against the interior of the drum, said face being vertically slotted so that the water may flow from the hollow interior of the shoe through said slot into the straining media of the drum when the drum rotates past the shoe, a pair of vertically-spaced slotted yokes extending radially towards the shaft from the back of the shoe, a fixed stand secured to the base about the shaft, vertically-spaced non-circular elements on said stand received in said yoke slots and embraced by the yokes, and bolts passing through the yokes engaging the said non-circular elements within said slots for effecting relative sliding movement between the slotted yokes and the said elements.

References Cited in the file of this patent

UNITED STATES PATENTS 1,950,466      Wille et al. _____ Mar. 13, 1934